3,123,435
PROCESS OF PREPARING URANIUM CARBIDE
William E. Miller and Howard L. Stethers, Naperville, and Terry R. Johnson, Glen Ellyn, Ill., assignors to the United States of America as represented by the United States Atomic Energy Commission
No Drawing. Filed July 18, 1962, Ser. No. 210,862
12 Claims. (Cl. 23—14.5)

This invention relates to the preparation of uranium monocarbide which has utility as fuel for nuclear reactors.

Heretofore uranium monocarbide has been produced by heating a mixture of molten uranium and carbon powder. However, the density of the two reactants is so radically different, and wetting of the carbon by the molten uranium is so poor that conversion of the uranium to the carbide is incomplete.

According to another process used, the uranium metal is reacted in solution in a molten metal, such as cadmium, zinc, magnesium, cadmium-zinc or magnesium-zinc alloy. This process is the subject matter of copending application Serial No. 134,059, filed by Alfred Schneider et al. on August 25, 1961; it produces better results than when no metal solvent is employed, but it still has a number of drawbacks. An excess of carbon is necessary to bring about a high degree of reaction. The product consequently is not a uniform and pure uranium monocarbide, but it contains varying amounts of higher carbides which are undesirable for reactor fuel because of the reduced uranium concentration.

It is an object of this invention to provide an improved process for producing uranium monocarbide from carbon and molten uranium alloy whereby satisfactory surface contact of the carbon by the alloy is obtained and consequently a more uniform and more complete reaction is brought about than is the case with the above-described processes.

It is another object of this invention to provide uranium monocarbide which contains very little unreacted carbon and a minimum of higher carbides.

It is finally also an object of this invention to provide a process for the production of uranium monocarbide which does not require the use of an excessive amount of carbon, so that the carbon content of the product can be controlled with great precision.

It has been found that in the presence of a small quantity of alkali metal, such as sodium or potassium, the reaction between uranium and carbon is greatly improved. The reaction then proceeds practically to completion at a comparatively low temperature, because surface contact of the carbon powder and the molten uranium alloy is radically improved by the alkali metal.

The process of this invention thus comprises dissolving uranium in a molten metal, such as cadmium, zinc, or alloys predominant in either or both of these metals, adding alkali metal to the mixture obtained, adding carbon powder in an about stoichiometric quantity, agitating the mass while maintaining it at between about 500 and 820° C. whereby uranium monocarbide precipitates, and separating the uranium monocarbide from the molten metal.

As the metal solvent, cadmium, zinc, cadmium-zinc and magnesium-zinc have been found best suitable. Magnesium-zinc containing from 10 to 20% magnesium is preferred. The metal preferably is used in a quantity that the uranium content ranges between 1 and 15% by weight; a uranium content of from 5 to 15% is best for the zinc-magnesium solvent, of 1 to 2% for the cadmium solvent, about 5% for zinc only. Sodium or potassium is then added in a quantity of between 0.5 and 5% by weight as referred to the total amount of metal, that is, the solvent metal plus the uranium.

While a temperature of between 500 and 820° C. was found suitable, the range between 700 and 800° C. is preferred. Agitation of the mass is necessary to obtain sufficient contact and reaction, because sodium as well as potassium are practically insoluble in the solvent metals for uranium.

The carbon can either be activated carbon or powdered graphite. The graphite has the advantage that the carbide produced from it settles faster than that obtained from the activated carbon. The carbon is added in a quantity close to the stoichiometric amount but, if an excess is employed, it should not be above 5% over the amount theoretically required. Instead of adding the carbon after the alkali metal, both the carbon and alkali metal can be incorporated simultaneously in the form of a mixture. By this, a still better distribution is obtained.

The carbon is advantageously degassed before use by heating it for from two to three hours at about 800° C. The reaction has to be carried out under the exclusion of oxygen and moisture; for this purpose an inert atmosphere of argon or helium is employed, or else the pressure is reduced to at least 10 microns of mercury.

The process can be carried out in an induction-heated furnace or in any other suitable furnace known to those skilled in the art. For the experiments that led to this invention and are described herein a tantalum crucible was used. The reaction was usually completed after two hours.

After the reaction the uranium carbide formed has to be separated from the supernatant metal. This can either be done by decantation; or by siphoning the liquid metal off from the precipitated carbide; or by cooling the solvent metal to below solidification temperature, whereby the settling of the carbide is usually accelerated, and subsequent separation. In the case of magnesium-zinc within the range specified above as the solvent metal, solidification occurs at between 590 and 400° C., depending on the exact composition.

The uranium carbide which has thus been separated from the bulk of the solvent metal is then treated for separation of the last traces of solvent metal. This is done by "retorting," which comprises heating at about 830° C. for six hours at a reduced pressure of about 1 micron of mercury. If retorting is to be carried out in another crucible than that used for the production of the monocarbide, contact with air and moisture has to be carefully avoided in the transfer of the product.

In the following, a few examples are given to illustrate the improvement obtained by the addition of alkali metal. In each of these experiments the degree of reaction was determined by analyzing the solvent metal after certain intervals for its uranium content. The product was also analyzed in each case for its carbon content.

*Example I*

Thirty grams of uranium were dissolved in a mixture of 30 grams of magnesium and 240 grams of zinc at 700° C. To this mixture there were added 3 grams of sodium metal and thereafter 1.5 grams of carbon. The reaction mixture was stirred at 450 r.p.m., and the metal was analyzed after each hour. While after the first hour 0.4% of the uranium was present in the solvent metal, after the second, third, fourth and fifth hours each, the nonreacted uranium content in the solvent metal was 0.2%. The carbide, after isolation, was analyzed and found to have an atomic ratio of carbon:uranium of 1.01. The yield was 90%.

Example II

In the following example a number of runs are compared, in some of which (runs 1–5) no sodium was used, while for runs 6 and 7 a small amount of sodium was added. In all these runs of Example II the carbon had been degassed prior to use. The conditions of these runs and the results are compiled in the following table.

| Run No. | U (w/o) | Mg (w/o) | Zn (w/o) | Na (w/o) | C:U (atom) | Reaction Temp. (°C.) | Percent of Uranium Remaining in Solution after— | | | | | Product C:U (atom) | Yield, Percent |
|---|---|---|---|---|---|---|---|---|---|---|---|---|---|
| | | | | | | | 1 hr. | 2 hrs. | 3 hrs. | 4 hrs. | 5 hrs. | | |
| 1 | 15 | 12 | 83 | | 1.04 | 805 | 44 | 33 | 28 | 24 | 22 | | 68 |
| 2 | 15 | 12 | 83 | | 1.50 | 800 | 43 | 26 | 11 | 2 | 0.2 | 1.28 | 43 |
| 3 | 15 | 12 | 83 | | 1.50 | 800 | 34 | 27 | 22 | 20 | 20 | 1.15 | 93 |
| 4 | 15 | 12 | 83 | | 1.20 | 800 | 33 | 25 | 20 | 18 | 17 | 1.19 | 81 |
| 5 | 14 | 12 | 74 | | 1.51 | 805 | 49 | 26 | 14 | 7 | 3 | 1.21 | 91 |
| 6 | 10 | 18 | 72 | 1.3 | 1.28 | 750 | 25 | 5 | 2 | 0.8 | 0.5 | 1.16 | 85 |
| 7 | 10 | 18 | 72 | 1.2 | 1.10 | 760 | | 12 | 10 | 8 | 5 | 1.12 | |

It will be obvious from a comparison of the above experiments that, when sodium was used, a lower reaction temperature and restriction of the carbon to almost stoichiometric quantities were possible. Also, the reaction was completed sooner than in the runs without the alkali metal.

It will be understood that the invention is not to be limited to the details given herein but that it may be modified within the scope of the appended claims.

What is claimed is:

1. A process of preparing uranium monocarbide, comprising dissolving uranium metal in a molten solvent metal selected from the group consisting of cadmium, zinc, cadmium-zinc alloy and magnesium-zinc alloy; adding a small quantity of alkali metal to the uranium solution formed; adding an about stoichiometric amount of carbon while maintaining the mass at between 500 and 820° C. and under agitation whereby uranium monocarbide forms and precipitates; and separating the uranium monocarbide from the molten metal.

2. The process of claim 1 wherein the temperature is maintained at between 700 and 800° C.

3. The process of claim 1 wherein the uranium is present in the solvent metal in a concentration of between 1 and 15% by weight and the alkali metal in the uranium solvent metal mixture in an amount of between 0.5 and 5% by weight.

4. The process of claim 3 wherein the solvent metal is a zinc-magnesium alloy and the uranium content is between 5 and 15% by weight.

5. The process of claim 3 wherein the solvent metal is zinc and the uranium content is about 5%.

6. The process of claim 3 wherein the solvent metal is cadmium and the uranium content in the cadmium solution is between 1 and 2%.

7. The process of claim 1 wherein the carbon content is below a 5% excess over the stoichiometric amount.

8. The process of claim 7 wherein the carbon is activated carbon.

9. The process of claim 7 wherein the carbon is powdered graphite.

10. The process of claim 7 wherein the carbon and alkali metal are added in the form of a mixture.

11. A process of preparing uranium monocarbide, comprising dissolving 10 parts by weight of uranium in 90% by weight of a molten binary zinc alloy at a temperature between 700 and 800° C. containing from 10 to 20% by weight of magnesium; adding from 0.5 to 5% by weight of sodium metal to the molten uranium solution; adding, under agitation, an about stoichiometric amount of powdered graphite, whereby uranium monocarbide forms; cooling the reaction mass to below 500° C., whereby the uranium monocarbide precipitates and the magnesium-zinc alloy solidifies; and mechanically separating the uranium monocarbide from the bulk of the magnesium-zinc.

12. The process of claim 11 wherein any remaining magnesium-zinc is removed from the uranium monocarbide by heating the latter at about 830° C. under reduced pressure.

References Cited in the file of this patent

UNITED STATES PATENTS

| | | |
|---|---|---|
| 2,113,354 | McKenna | Apr. 5, 1938 |
| 2,124,509 | McKenna | July 19, 1938 |

OTHER REFERENCES

AEC Document ANL-6543, June 1962, pp. 59 and 60.